(12) United States Patent
Xia

(10) Patent No.: US 6,542,900 B1
(45) Date of Patent: Apr. 1, 2003

(54) METHOD AND APPARATUS FOR DISTRIBUTED OBJECT MAPPING IN A JAVA LANGUAGE ENVIRONMENT

(75) Inventor: Chun R. Xia, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/412,096

(22) Filed: Oct. 4, 1999

(51) Int. Cl.[7] .............................................. G06F 17/30
(52) U.S. Cl. ............................ 707/103; 709/105; 714/4
(58) Field of Search ..................... 707/103; 709/105; 714/4

(56) References Cited

U.S. PATENT DOCUMENTS 5,848,419 A  * 12/1998  Hapner et al. .............. 707/103
5,878,411 A  *  3/1999  Burroughs et al. ............. 707/4
5,970,500 A  * 10/1999  Sabatini et al. ............. 707/104
6,154,849 A  * 11/2000  Xia .................................. 714/4
6,209,018 B1 *  3/2001  Ben-Shachar et al. ...... 709/105
2002/0091702 A1 *  7/2002  Mullins ....................... 707/100

OTHER PUBLICATIONS

SmartSockets Network By Smart Sockets DataSheet Programming in a Day! Feb. 12, 1999, pp. 1–2.
Real–Time Inference Engine By Real–Time Inference Engine (RTie) Feb. 12, 1999, pp. 1–4.

* cited by examiner

Primary Examiner—Charles Rones
(74) Attorney, Agent, or Firm—O'Melveny & Myers LLP

(57) ABSTRACT

A method and apparatus for performing distributed object mapping in a Java language environment includes creating a first object associated with a first language environment and a second object associated with a second language environment. At least one of the objects is a native or legacy object-oriented language object.

15 Claims, 5 Drawing Sheets

METHOD AND APPARATUS FOR DISTRIBUTED OBJECT MAPPING IN A JAVA LANGUAGE ENVIRONMENT

FIELD OF THE INVENTION

This application relates generally to performing object mapping. More specifically, the present invention includes a method and apparatus for performing distributed object mapping in a Java language environment.

BACKGROUND OF THE INVENTION

Distributed processing has become more popular in recent years. Various "objects" located in different address spaces communicate with each other to perform respective data processing transactions.

Conventional systems often use objects written in the same programming language that are located in different address spaces. Objects that are defined in two different languages and are running at two different address spaces cannot be referenced by each other. For example, a conventional Java language environment cannot transparently address remote objects written in a proprietary language environment.

Object mapping or language mapping is well-known in database applications when a proprietary language is needed to be embedded in an object oriented language. For example, JSQL is a version of SQL (Structured Query Language) that can be embedded in Java. As another example, Oracle OCI is a version of SQL that can be embedded in C++. These solutions, however, do not deal with distributed object problems because these various versions of SQL are not object oriented languages. These variations of SQL are embedded objects and cannot be executed in different address spaces or on different machines. There is no strong syntactic mapping because SQL is not an object-oriented language. In other words, the interface between the embedded objects and the object oriented language is opaque and not easily manipulated.

On the other hand, JavaSoft's Java Native Interface (JNI) can map objects between Java and C++, but does not attempt to map distributed objects. There is no implicit distributed object mapping mechanism built into JNI.

SUMMARY OF THE INVENTION

The present invention provides an object mapping for distributed objects that maintains the language's syntactic structure so that the remote non-Java object may be manipulated transparently in Java. Syntactic structure refers to the programming language syntax. This may include, for example, object creation, object destruction, attribute references, and method invocations. This object mapping for distributed objects is performed via a generic interface that is designed to provide a certain level of transparency between Java and a legacy object oriented language. For example, in an embodiment of the present invention, this generic interface provides a level of transparency between Java and a knowledge system shell called RTie.

This method and apparatus for performing distributed native object mapping has the advantage that it provides a transparent interface between Java and a legacy object oriented language so that developers can walk easily between imperative and logic programming paradigms and can make appropriate design tradeoffs.

In accordance with the purpose of the invention, as embodied and broadly described herein, the invention relates to a system and method for performing distributed object mapping in a Java language environment. The method includes the steps of creating a first object associated with a first language environment and creating a second object associated with a second language environment. The method further includes the step of transparently mapping between the first object and the second object. At least one of the objects will be associated with a native or legacy object oriented language.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF PREFERRED EMBODIMENTS

I. General Discussion

Figure 1:
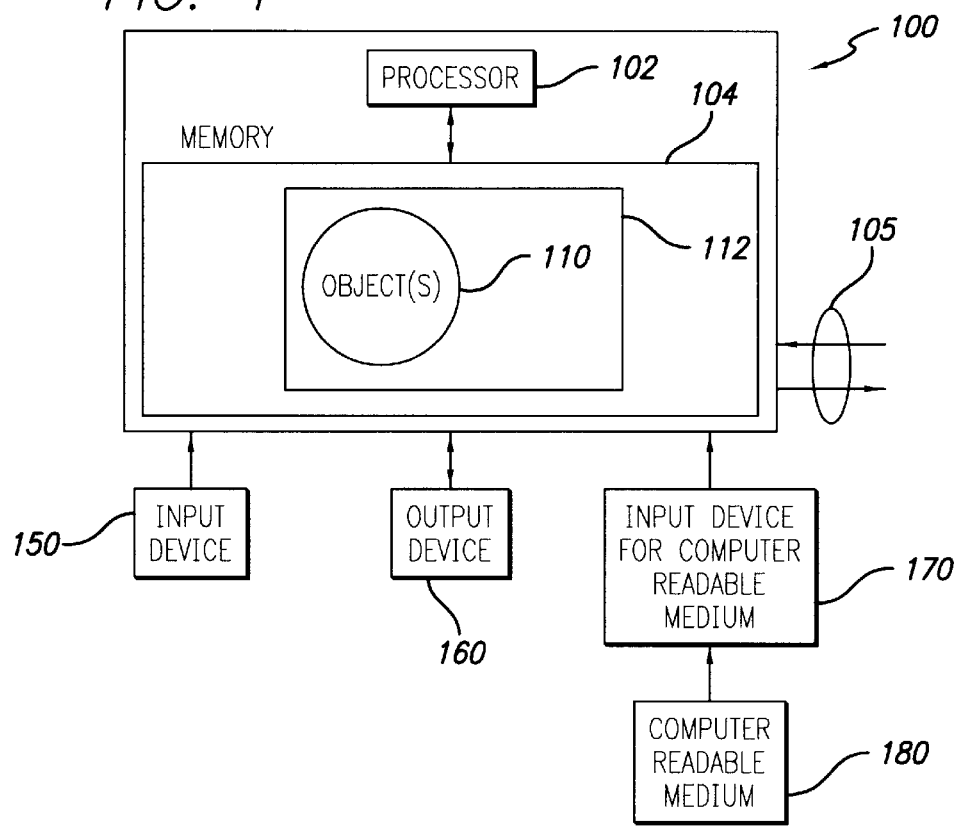
FIG. 1 is a block diagram of a computer system in accordance with an embodiment of the present invention.

FIG. 1 is a block diagram of a data processing system 100 in accordance with a preferred embodiment of the present invention. In FIG. 1, data processing system 100 includes a processor 102 and a data storage area (e.g., a memory) 104. Storage area 104 preferably also includes software (not shown) for communicating with a network, such as a LAN, WAN, or the internet, although the invention also can be implemented on standalone computers.

System 100 preferably includes an input device 150, such as a keyboard, pointing device, mouse, touchpad, etc., which allows input to be read by processor 102. System 100 preferably also includes an output device 160. This output device can be, for example, a computer monitor, a display device, or any device that allows processor 102 to send or display output.

A person of ordinary skill in the art will understand that system 100 may also contain additional elements, such as input/output lines; additional input devices, such as a keyboard, a mouse, and a voice input device; and display devices, such as a display terminal. System 100 may also include a computer readable input device 170, such as a floppy disk drive, CD ROM reader, or DVD reader, that reads computer instructions stored on a computer readable medium 180, such as a floppy disk, a CD ROM, or a DVD disk. System 100 also may include application programs, operating systems, data, etc., which are not shown in the figure for the sake of clarity. It will be understood that system 100 can also include numerous other elements not shown, such as network connections, additional memory, additional processors or CPUs, LANs, etc.

In the following discussion, it will be understood that the steps of methods and flow charts herein discussed herein preferably are performed by processor 102 (or another appropriate processor) executing instructions stored in storage area 104 (or other appropriate memories or storage areas). Storage area 104 may include objects 110, for example Java objects, contained within a language environment 112, for example the Java language environment. Java is a trademark or registered trademark of Sun Microsystems, Inc. in the United States and other countries. Storage area 104 may include a legacy language environment, for example the RTie language environment. RTie is a trademark or registered trademark of Talarian Corporation in the United States and other countries. It will also be understood that the invention is not limited to any particular implementation or programming technique and that the invention may be implemented using any appropriate techniques for implementing the functionality described herein. The invention is not limited to any particular programming language or operating system.

The instructions in storage area 104 may be read into storage area 104 from a computer-readable medium 180. Execution of sequences of instructions contained in main memory causes one of the processors to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infrared data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

II. An Opaque Interface between Java and a Legacy Object-Oriented Language

Figure 2:
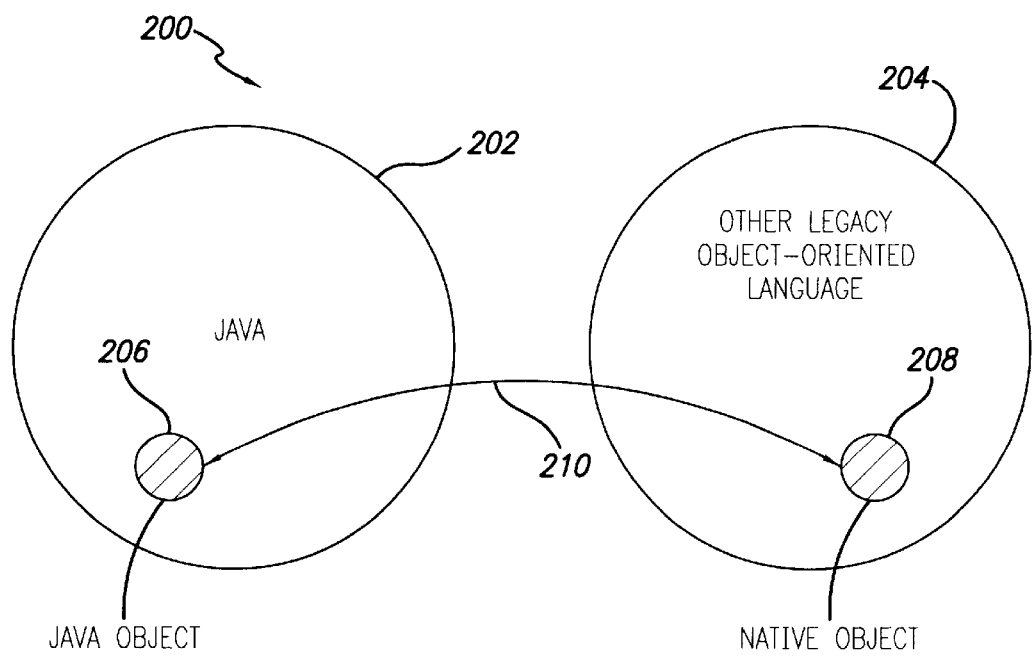
FIG. 2 is a block diagram showing a Java object being mapped to a native object in a legacy object oriented language in accordance with an embodiment of the present invention.

FIG. 2 shows object mapping 200 between a Java language environment 202 and a legacy object-oriented language 204. The legacy object-oriented language may be, for example, the Real-Time Inference Engine (RTie) language environment. RTie is a trademark or registered trademark of Talarian Corporation in the United States and other countries. RTie is a knowledge system shell that is used as a tool for developing and operating high-performance data analysis and decision-making systems. The RTie shell itself forms a barrier between Java and its own proprietary language environment. The typical usage of RTie is collecting data from sensors and feeding the data into RTie for processing. After processing, the resulting analysis is displayed by a graphical user interface (GUI) or used to control some devices.

Object mapping 200 of a Java object 206 to a native object 208 is performed via an "opaque" interface 210 between the Java environment 202 and the other legacy object-oriented language environment 204. The mapping operation includes object creation, object destruction, setting attributes, and method invocation (callback). Opaque interface 210 is the application programming interface (API) that is provided by the legacy object-oriented language environment, for example the API provided by Talarian Corporation for RTie. The interface is referred to as "opaque" because it requires that the developers write code in order to implement it. Writing the interface code is straightforward but results in high development costs when the interface itself becomes very large.

Some of the basic steps to write the interface code for RTie include the following. (1) Build a Java wrapper on the legacy object (RTie) so that RTie may be run from Java. This is done using a Java native method "runRTie" to invoke RTie as a runtime inference engine as a door to RTie. (2) An alternative to building Java wrapper is to use a C interface to RTie. In this case, the C language is used as a bridge between Java and RTie. The skeleton of C code is used to define three RTie frame related functions: open, frame, close. If no interface preparation is needed, then open and close are dummy functions. (3) Before feeding data from Java to RTie, an RTie class with object attribute field needs to be defined. RTie calls it a "slot." The class definition is in the .cl file in the RTie environment. The RTie object chould be created prior to data feeding and can be created either statically in a RTie initialization file (.in) or created on the fly as a dynamic object. The RTie object may be created dynamically in rules but writing rules for a complete resource manager is tedious. (4) To send data from Java to RTie, a frame function is defined to receive data from a "data source." (5) To push data back from RTie to Java, a RTie slot callback function needs to be used, i.e., when the value of a slot is altered, RTie can invoke a preregistered C API function. This C function will then invoke a Java method through the Java Native Interface (JNI) for side-effects on a Java variable. The callback should be registered at "open" session. (6) To invoke a Java method from RTie, RTie user defined functions need to be used. The RTie C API will make the Java method invocation through JNI.

The main problem with this method of interface coding is that it is very tedious if it is done case by case. The implementation is across three different languages: RTie, C, and Java. The implication of this is that debugging cannot be supported by popular debugging tools. When the interface becomes large and bulky, it becomes extremely difficult to identify subtle errors such as memory leaks.

Figure 3:
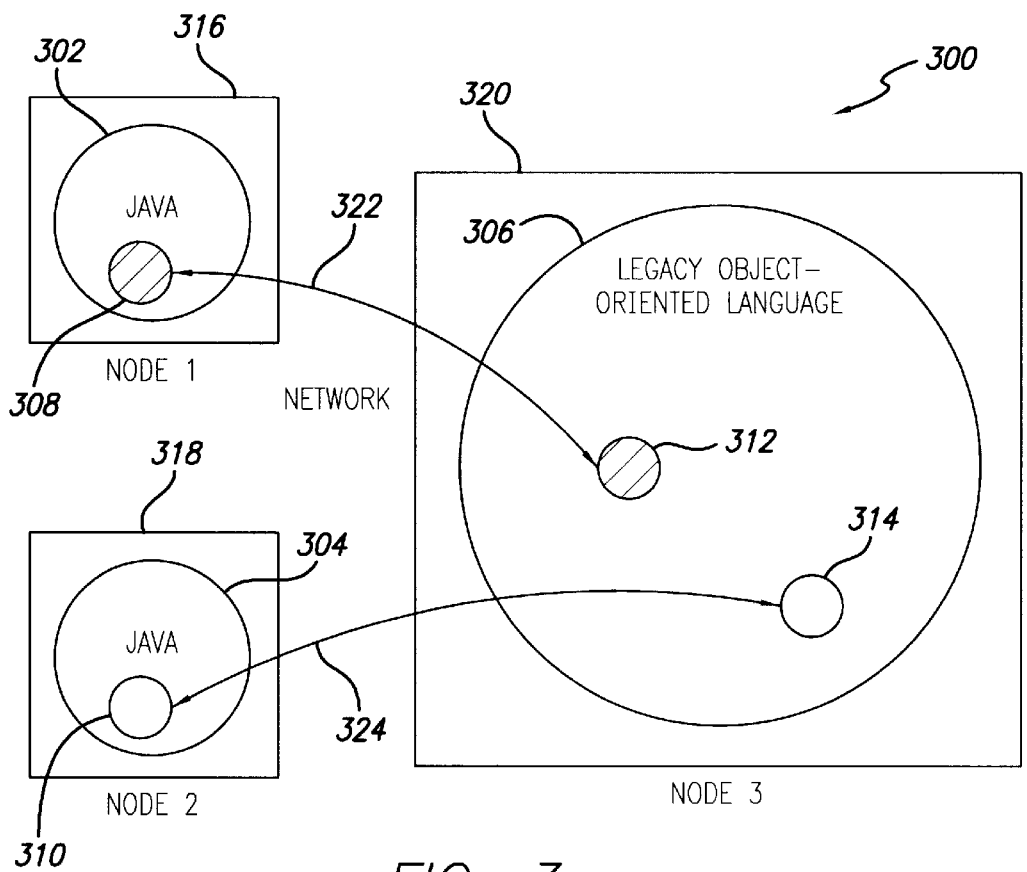
FIG. 3 is a block diagram showing remote object mapping.

FIG. 3 shows remote object mapping 300 over a network. Objects located on node 1 316 and node 2 318 are mapped to objects located on node 3 320. Specifically, object 308 in Java environment 302 is mapped to object 312 in legacy object-oriented language environment 306 via network interface 322. Object 310 in Java environment 304 is mapped to object 314 in legacy object-oriented language environment 306 via network interface 324.

III. Constructing a Transparent Interface with Object Mapping

To avoid the problems associated with the opaque interface described above, a transparent interface is developed. The transparent interface is based on a "Mappable" class as the base class for object mapping. The Mappable class is used for local object mapping. The Mappable class may have a number of subclasses, for example the RemoteMappable class. The RemoteMappable class is used for remote object mapping. Each subclass of Mappable maintains an object registration table. This table is created when the class is loaded.

An object may be created as either named or anonymous. The anonymous object is named by Java internal object hashcode for unique identification. The name is then registered in a class registration table. When the object is constructed, the corresponding legacy object, for example RTie object, is also created. Similarly, when the Java object is destroyed, the legacy object is also destroyed. The object should be created or destroyed from Java for mapping consistency. The attributes of the object are mapped by "set" or "update" methods in Java. "Set" alters an individual attribute. "Update" alters all attributes in the legacy object, for example an RTie object. A normal method is used to invoke the Java method for the legacy object.

IV. Mapping Distributed Java Objects

Java objects may be required to be mapped to an address space other than the legacy object-oriented language's address space, for example, RTie's address space. This is done through remote object mapping. Remote object mapping is designed to be transparent and to follow the same semantics as defined for the class "Mappable" for local object mapping. The remote object mapping class "RemoteMappable" is a subclass of the "Mappable" class.

The remote object mapping mechanism is implemented in a client/server manner. On the legacy language side, the Java Wrapper runs a remote mapping server, for example RMI servers 602 and 604 discussed below. On the remote Java object side, the Java class loader automatically creates a remote mapping client. The remote mapping client sends requests for object creation, object destruction, setting object attributes and updating object attributes.

In order to support a callback from the legacy object to the Java remote object, the client creates a callback server for each class and then passes the server's object handle to the server on the legacy language side. This server also functions as a client for callback. This is the standard callback mechanism in Remote Method Invocation (RMI). Using RMI callback can get rid of the RMI name registry for the RemoteMappable class so that distributed object names may be maintained by the server on the legacy language side only.

Figure 4:
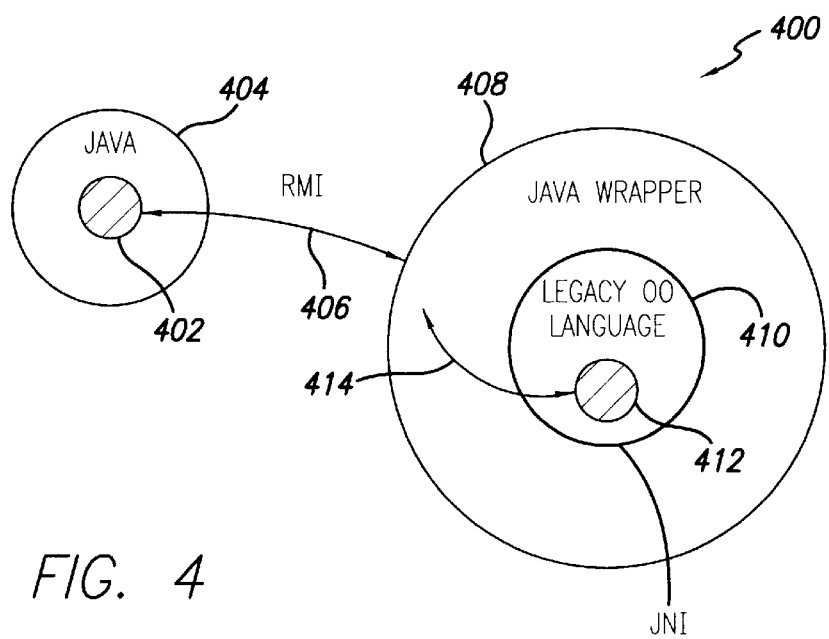
FIG. 4 is a block diagram showing an example of an architecture used for remote object mapping.

FIG. 4 shows an architecture 400 of remote object mapping. Java object 402 in Java environment 404 is remotely mapped to legacy object-oriented language object 412 via Remote Method Invocation (RMI) 406 to a Java wrapper 408. The legacy object-oriented language object 412 is wrapped by the Java wrapper 408 through the Java Native Interface (JNI) 414 so that the distributed object mapping may use RMI 406 across address spaces.

Figure 5:
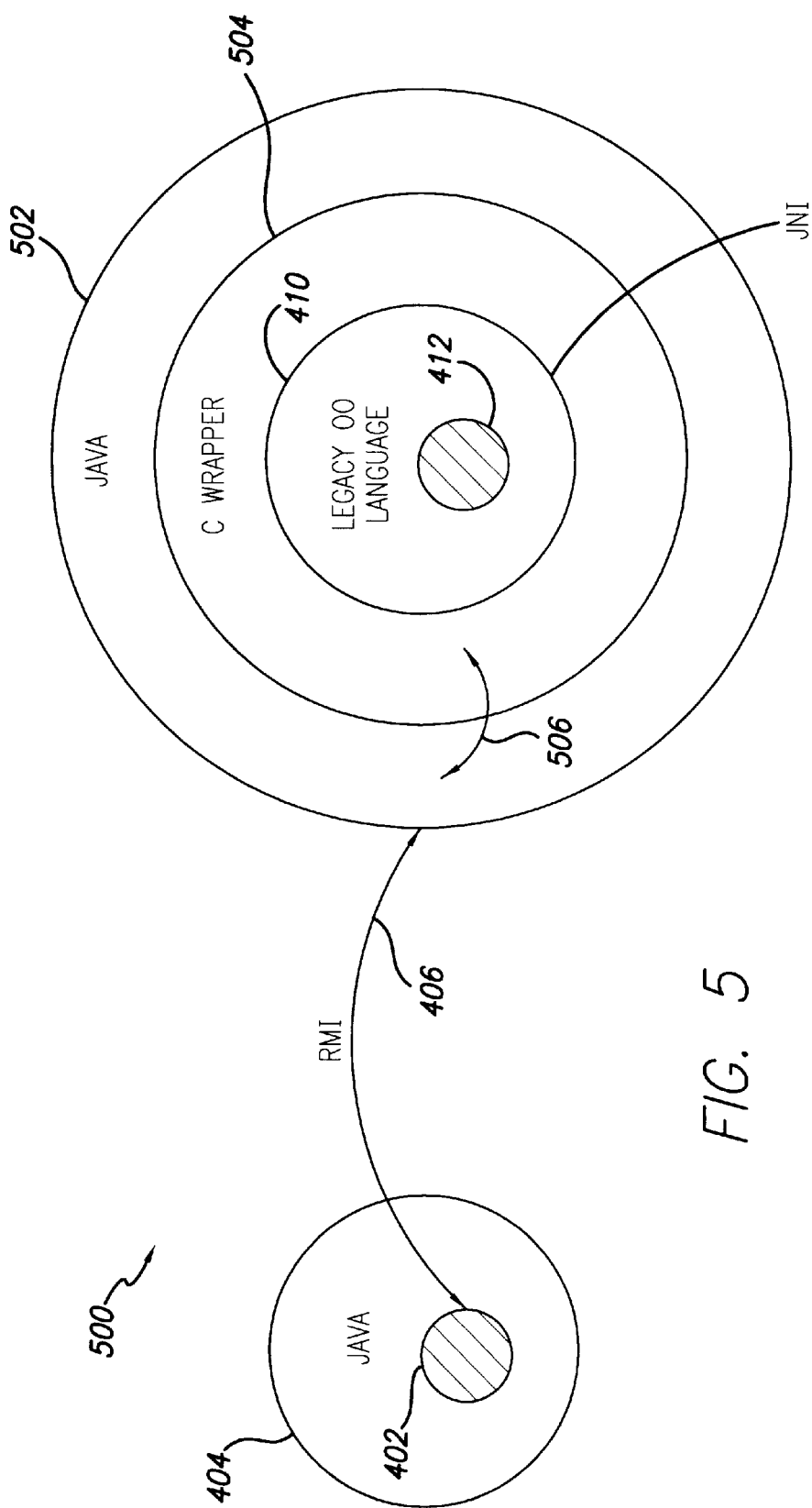
FIG. 5 is a block diagram showing remote object mapping in accordance with an embodiment of the present invention.

FIG. 5 shows another architecture 500 for performing remote object mapping. Java environment 404 and Java environment 502 are located in two different address spaces. Java object 402 in Java environment 404 is remotely mapped to legacy object-oriented language object 412 via Remote Method Invocation (RMI) 406 to Java environment 502. The legacy object-oriented language object 412 is first wrapped by C wrapper 504 which interfaces to Java through the Java Native Interface (JNI) 506 so that the distributed object mapping may use RMI 406 across address spaces.

Figure 6:
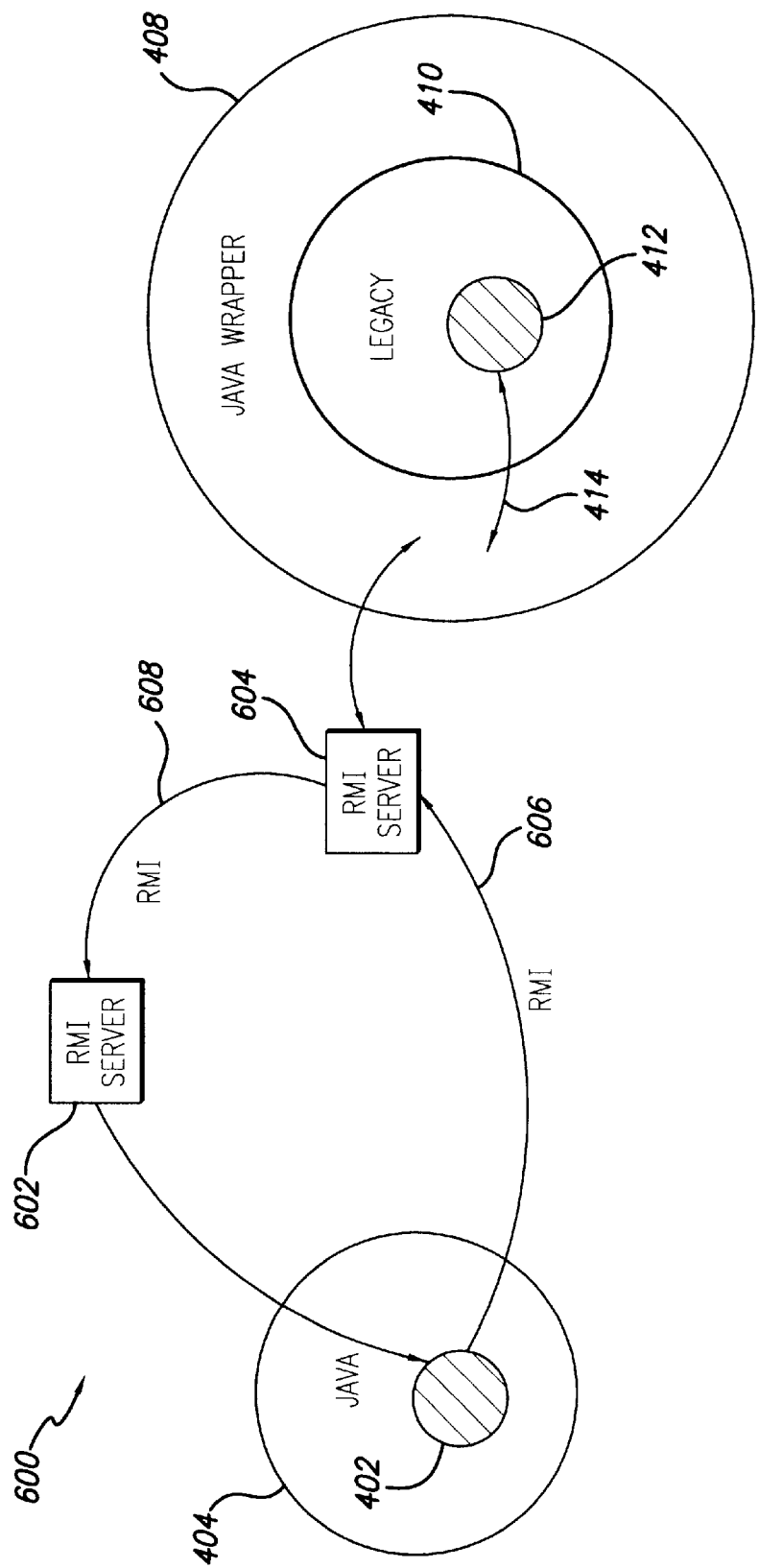
FIG. 6 is a block diagram showing an architecture of object mapping in accordance with an embodiment of the present invention.

FIG. 6 shows an example of the remote object mapping architecture 600 where the remote mapping object manipulations are actually done by RMI servers 602 and 604 at both sides of the mapping. RMI server 604 on the legacy object-oriented environment 410 side handles requests from the Java environment 404 side, as shown by RMI 606. RMI 606 includes requests such as create object, destroy object, and set slot. RMI server 602 on the Java environment 404 side handles callbacks, as shown by RMI 608. RMI 608 includes callbacks such as slot callbacks and method callbacks.

Figure 7:
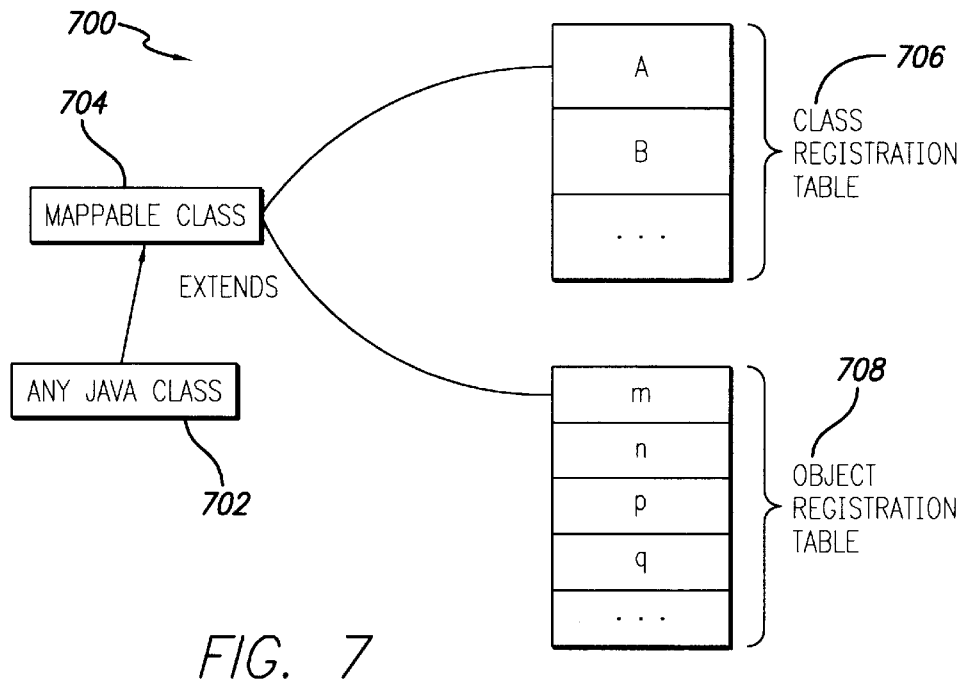
FIG. 7 is a block diagram showing an example of the object mapping architecture shown in FIG. 6.

FIG. 7 shows a block diagram of object mapping architecture 700. The way the architecture works is to extend any Java class 702 to a mappable class 704. The mappable class 704 is then broken out into a class registration table 706 and an object registration table 708.

Figure 8:
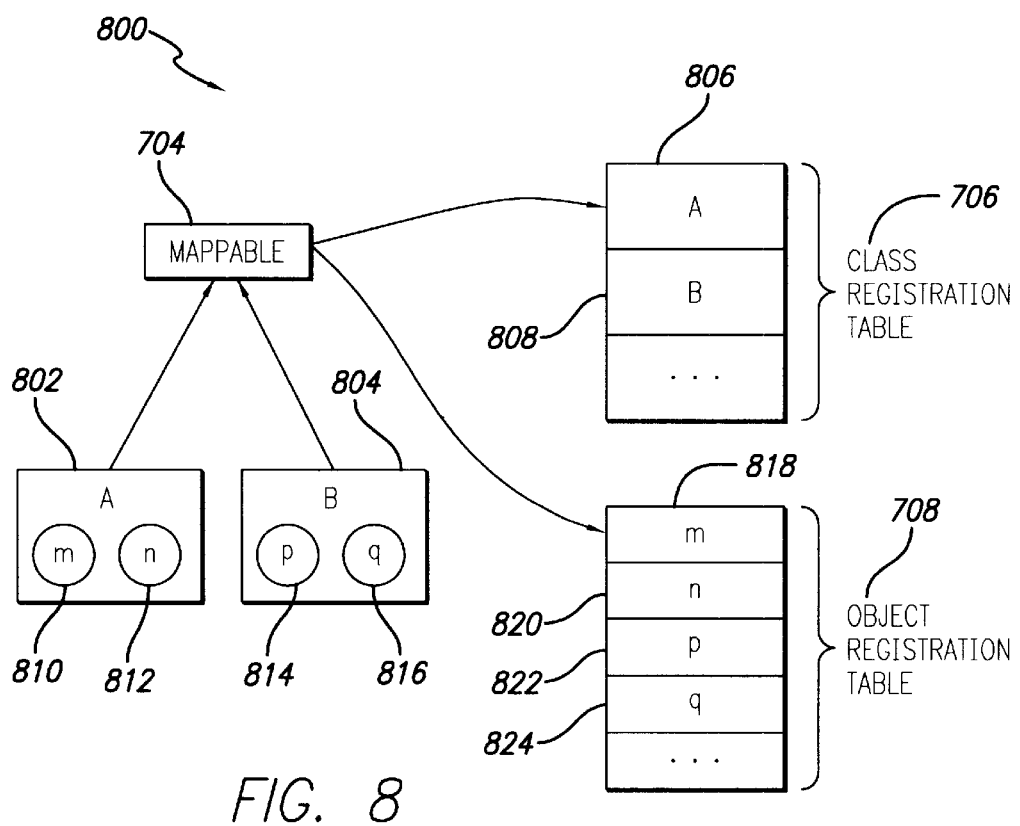
FIG. 8 is a block diagram showing an exampl of the object mapping architecture shown in FIG. 7.

FIG. 8 shows a block diagram example 800 of object mapping architecture 700. Java classes 802 and 804 are registered in the class registration table 706. Objects (instances) 810, 812, 814, and 816 are registered in the object registration table 708. Objects m 810 and n 812 are located in Java class A 802. Objects p 814 and q 816 are located in Java class B 804. Java classes A 802 and B 804 are extended to mappable class 704. From mappable class 704, Java class A 802 is mapped to location 806 in class registration table 706 and Java class B 804 is mapped to location 808 in class registration table 706. Object m 810 is mapped to location 818 in object registration table 708. Object n 812 is mapped to location 820 in object registration table 708. Object p 814 is mapped to location 822 in object registration table 708. Object q 816 is mapped to location 824 in object registration table 708. In an implementation where the legacy object-oriented language environment is RTie, all objects share the same name space due to a RTie restriction. Object name space can also be on a per class basis.

In summary, the present invention is a method and apparatus for providing distributed native object mapping in a Java language environment so as to provide a level of transparency between Java and a legacy object-oriented language.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method for performing distributed object mapping for a computer system, comprising the steps of:

creating a first object associated with a first language environment in a first memory location accessible to the computer system;

creating a second object associated with a second language environment in a second memory location accessible to the computer system; and transparently mapping between the first object and the second object such that syntactic structure of the second language environment is maintained by providing a transparent interface to allow the second object to be manipulated by the computer system in the first language environment, wherein the transparent interface is based on a mappable class as the base class for object mapping and is not an opaque interface.

2. The method of claim 1, wherein at least one language environment is the Java language environment.

3. The method of claim 1, wherein at least one language environment is the RTie language environment.

4. An apparatus for performing distributed object mapping, comprising:

a module configured to create a first object associated with a first language environment;

a module configured to create a second object associated with a second language environment; and a module configured to transparently map between the first object and the second object such that syntactic structure of the second language environment is maintained by providing a transparent interface to allow the second object to be manipulated by the computer system in the first language environment, wherein the transparent interface is based on a mappable class as the base class for object mapping and is not an opaque interface.

5. The apparatus of claim 4, wherein at least one language environment is the Java language environment.

6. The apparatus of claim 4, wherein at least one language environment is the RTie language environment.

7. An apparatus for performing distributed object mapping, comprising:

means for creating a first object associated with a first language environment;

means for creating a second object associated with a second language environment; and means for transparently mapping between the first object and the second object such that syntactic structure of the second language environment is maintained by providing a transparent interface to allow the second object to be manipulated by the computer system in the first language environment, wherein the transparent interface is based on a mappable class as the base class for object mapping and is not an opaque interface.

8. The method of claim 7, wherein at least one language environment is the Java language environment.

9. The method of claim 7, wherein at least one language environment is the RTie language environment.

10. A computer program product, comprising:

a computer usable medium having computer readable code embodied therein for performing distributed object mapping, including:

computer readable program code devices configured to cause a computer to effect creating a first object associated with a first language environment;

computer readable program code devices configured to cause a computer to effect for creating a second object associated with a second language environment;

computer readable program code devices configured to cause a computer to effect transparently mapping between the first object and the second object such that syntactic structure of the second language environment is maintained by providing a transparent interface to allow the second object to be manipulated by the computer system in the first language environment, wherein the transparent interface is based on a mappable class as the base class for object mapping and is not an opaque interface.

11. The computer program product of claim 10, wherein at least one language environment is the Java language environment.

12. The computer program product of claim 10, wherein at least one language environment is the RTie language environment.

13. A computer data signal embodied in a carrier wave and representing sequences of instructions which, when executed by a processor, cause the processor to perform distributed object mapping by performing the steps of:

creating a first object associated with a first language environment; creating a second object associated with a second language environment; and transparently mapping between the first object and the second object such that syntactic structure of the second language environment is maintained by providing a transparent interface to allow the second object to be manipulated by the computer system in the first language environment, wherein the transparent interface is based on a mappable class as the base class for object mapping and is not an opaque interface.

14. The computer data signal embodied in a carrier wave of claim 13, wherein at least one language environment is the Java language environment.

15. The computer data signal embodied in a carrier wave of claim 13, wherein at least one language environment is the RTie language environment.

* * * * *